Jan. 25, 1949.   F. A. HASSMAN ET AL   2,459,937
HYDRAULIC CONTROL SYSTEM

Filed Dec. 2, 1943   3 Sheets-Sheet 1

INVENTOR.
FRED A. HASSMAN
HANS ERNST
BY Leigh W. Wright
ATTORNEY.

INVENTOR.
FRED A. HASSMAN
HANS ERNST
BY Leigh W. Wright.

Patented Jan. 25, 1949

2,459,937

UNITED STATES PATENT OFFICE 2,459,937

HYDRAULIC CONTROL SYSTEM

Fred A. Hassman and Hans Ernst, Cincinnati, Ohio, assignors to The Cincinnati Milling Machine Co., Cincinnati, Ohio, a corporation of Ohio Application December 2, 1943, Serial No. 512,664

7 Claims. (Cl. 90—11)

1

This invention relates to machine tools and more particularly to improvements in hydraulic control systems therefor.

Control mechanisms for operating or shifting the various control devices of machine tools and the like are now very often built of the hydraulically operated type. Some of these devices are subject to frequent operation but require small volumetric amounts of fluid to complete their operation while other devices are operated less frequently but require large volumetric amounts of fluid to complete their actuation. The grouping of such devices which make widely varying consumptive demands upon a fluid supply source and their frequency of operation being so irregular, create an economic problem in providing a suitable source of pressure supply because it must have sufficient capacity to meet sudden demands for large volumes which only occur occasionally while the normal operating consumptive demand is a relatively small volume at high pressure.

It is, therefore, an object of this invention to provide an improved and economic fluid pressure supply system for hydraulically operated mechanisms of machine tools and the like.

Another object of this invention is to provide an improved supply system which normally operates to provide a small volumetric supply, but which is capable of automatically increasing the volume upon demand for large operating volumes.

Still another object is to provide an improved fluid pressure supply system capable of automatically adjusting itself to the demand of fluid pressure required and which normally operates automatically under substantially no load condition until demand for large operating volumes is required.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
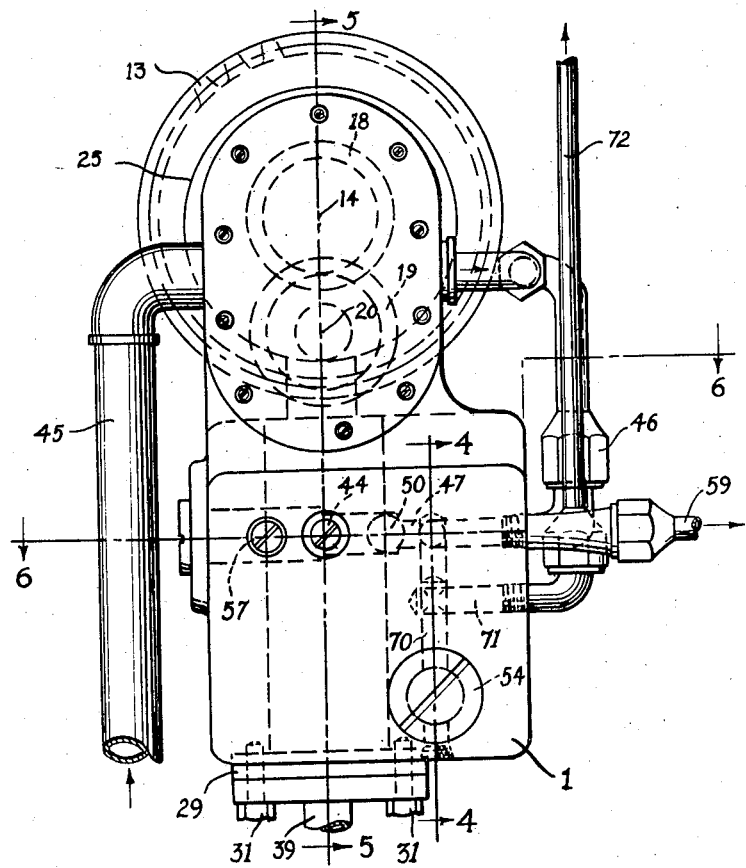
Figure 1 is a front elevational view showing the hydraulic pump embodying the features of this invention.

2 ing a typical application of the pump of Figure 1 to a milling machine.

Figure 4:
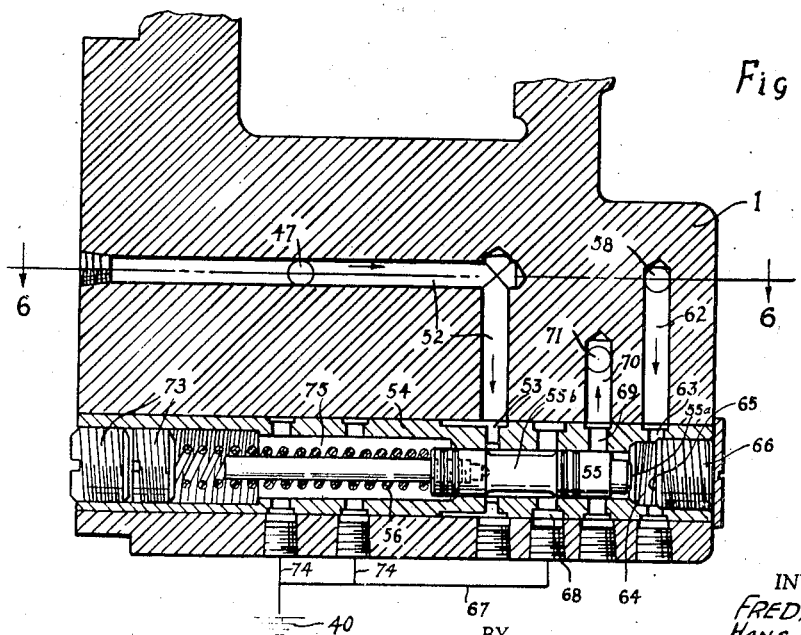
Figure 6:
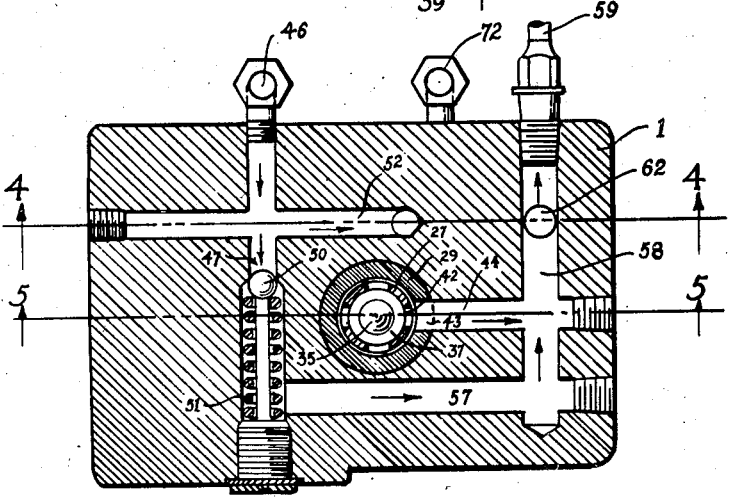

Figure 4 is a section through the pump on the line 4—4 of Figures 1 and 6.

Figure 3:
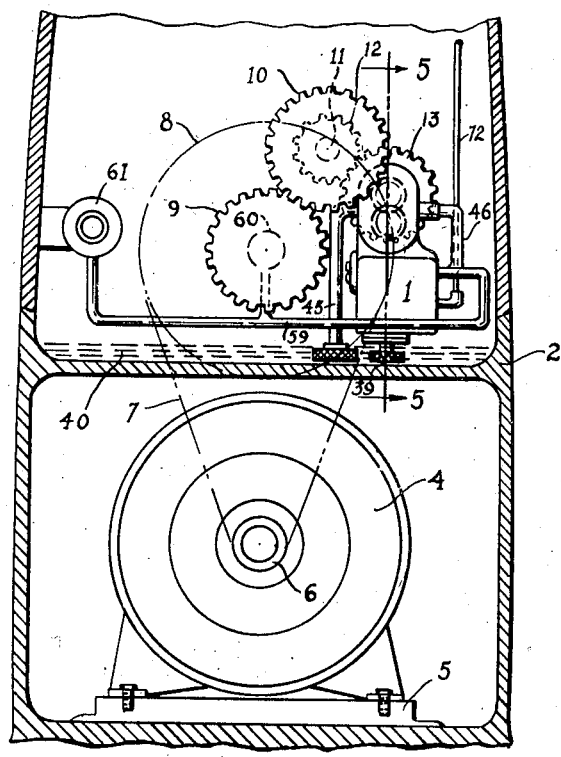
Figure 3 is a fragmentary sectional view show-
Figure 5:
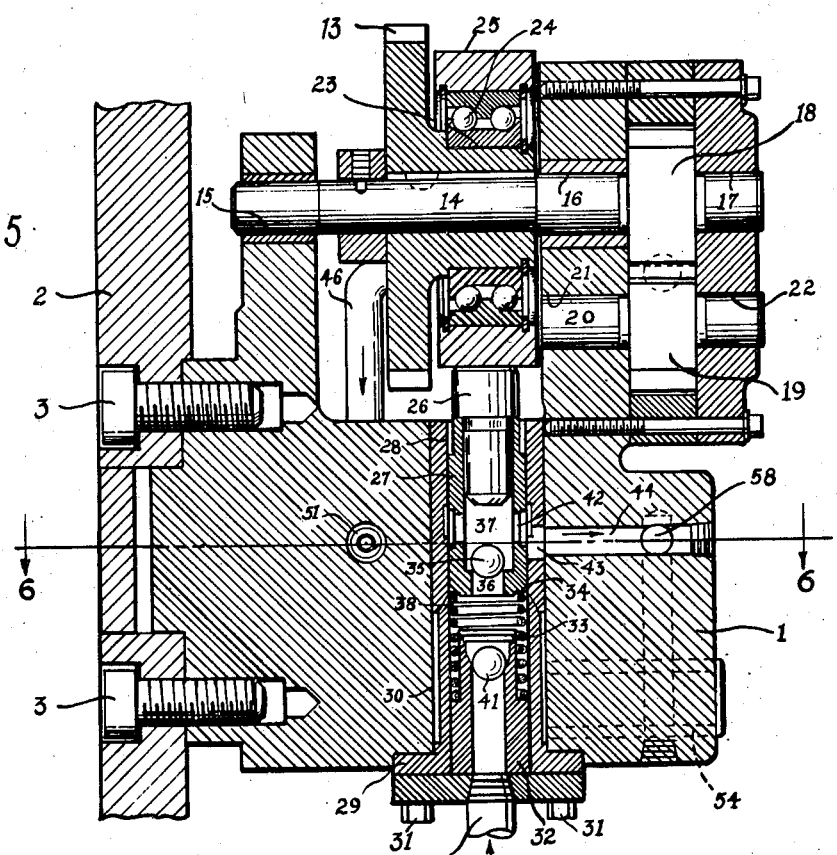

Figure 5 is a vertical section through the pump on the line 5—5 of Figures 1, 3 and 6.

Figure 6 is a section through the pump on the line 6—6 of Figures 1, 4 and 5.

As an example of a machine tool which has fluid operable control devices which create large and small consumptive demands on a source of fluid pressure at irregular frequencies, there is illustrated a milling machine which has a control valve for a hydraulically operated gear shifting system, requiring large volumes of fluid but which is only operated occasionally and other devices operated more frequently such as clutch operating devices and a lubricating system which consume relatively small volumes of fluid.

Referring particularly to Figures 1, 3 and 5, the source of fluid pressure or pump comprises a main body 1 which is appropriately mounted on the column 2 of the machine tool or milling machine by suitable bolts 3 which securely hold the pump in position where it may be driven from some source of power of the machine, such as the prime mover or main drive motor 4, which is usually carried on a suitable plate 5 on the column 2 of the machine. The motor 4 is connected by means of its pulley 6 through a belt 7 to the main driving pulley 8 of the milling machine transmission. A gear 9 is provided which is connected to and constantly driven by the pulley 8 when the motor 4 is operating. The gear 9, in turn, drives a gear 10 appropriately journaled on a shaft 11 fixed in the column 2 and is connected to drive a gear 12 which, in turn, drives the gear 13 of the hydraulic pump. In this way the pump is normally continuously driven during the operation of the milling machine.

Referring to Figure 5, the driving gear 13 of the pump is fixed on a shaft 14 journaled in appropriate bearings 15, 16 and 17 carried in the housing 1 of the pump. Formed on the shaft 14 is a pump gear 18 which is in mesh with a mating pump gear 19 of a shaft 20 also journaled in the housing 1 in suitable bearings 21 and 22. Thus is provided a low-pressure, high-volume gear pump comprising the gears 18 and 19 which are driven from the gear 13 through the shaft 14.

On the hub of the gear 13 is formed a cylindrical surface portion 23 which is positioned eccentrically of the axis of rotation of the gear 13 and shaft 14. On this eccentric portion is mounted an anti-friction ball bearing 24 on the outer race of which is fixed an actuating cam 25 engaging the abutment plug 26 fixed in the plunger pump piston 27 reciprocatingly mounted in the bore 28 of the sleeve 29 forming the high pressure plunger pump cylinder. The sleeve 29 is mounted in a bore 30 formed in the housing 1 and rigidly held in place by appropriate screws 31. In the bottom of the bore 28 of the plunger pump cylinder is provided a bushing 32 against which bears a spring 33 which normally presses against the bottom portion 34 of the plunger pump piston 27 to move it upward to maintain its abutment plug 26 in constant engagement with the actuating cam 25. Thus, rotation of the gear 13 in driving the gear pump also actuates the eccentric cam 25 to effect reciprocation in the plunger pump piston 27.

A ball check valve 35 is provided in the piston 27, Figure 5, so that upon downward movement of the piston 27 fluid may pass through the opening 36 formed in the piston 27 and pass into the upper chamber 37 thereof. However, upon the upward movement of the piston 27 the ball 35 will close the opening 36 and provide a suction in the portion 38 formed by the cylinder bore 28 below plunger 27. Upon this upward movement of the piston 27 fluid will be drawn in through the suction or intake line 39 from a suitable reservoir 40 formed in the machine tool housing or column 2, Figures 2 and 3, and will raise the ball check valve 41, bringing fluid into the portion 38 of the cylinder bore 28. Downward movement of the piston 27 will close the ball check valve 41 preventing escape of fluid back down through the line 39 and which will confine the fluid in the chamber 38 forcing up the ball check valve 35, bringing pressure fluid into the chamber 37. Fluid is expelled therefrom through a port 42 in the piston sleeve 27 which is in communication with a port 43 in the sleeve 28 from which it enters the passageway 44 formed in the housing 1. Thus is provided a source of high pressure fluid in the line 44 upon rotation of the driving gear 13 from the main drive motor as described.

Figure 2:
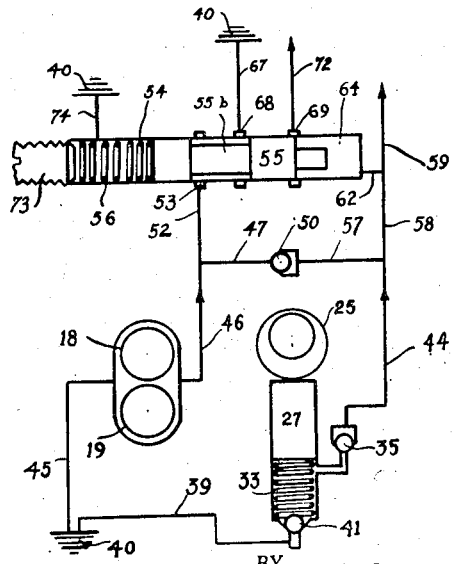
Figure 2 is a hydraulic circuit diagram of the hydraulic pump of Figure 1.

Referring to Figure 2, it will be noted that the gear pump 18—19 also receives its supply of fluid from the reservoir 40 through a suction line 45 and discharges fluid through a line 46 connected to a passageway 47, Figure 6, in the pump housing which is in communication with a check valve having a spring-urged ball 50 yieldingly held against the pressure coming from the line 58 by means of a spring 51 to facilitate the rapid and proper seating of the ball 50. A branch line 52 of the line 46, Figure 4, is connected to a port 53 of an automatic variable demand compensating and relief valve 54 mounted in the housing 1 of the pump. This valve 54 has an axially slidable plunger 55 normally moved to the right, as seen in Figure 4, by a spring 56 which bears against the left hand end of the plunger 55 to normally close off the port 53 and prevent escape of gear pump pressure through passageway 52.

Referring to Figure 6, it will be noted that fluid pressure from the gear pump 18—19 passes through the check valve 50 into a passageway 57 which is in communication with a passageway 58 to which is also connected the output passageway 44 of the plunger pump cylinder 29. Thus, when large volumes of fluid are required from the pumps, it may be delivered through the common pressure supply line 59, the check valve 50 permitting the gear pump discharge from the line 46 to be automatically added to the discharge through the line 44 from the plunger pump 29.

Such large volume low pressure fluid supply from the line 59 is required to properly actuate the control devices, Figure 3, of the milling machine, such as, for example, the spindle stop and start mechanism, indicated generally at 60, and the power speed changing mechanism control device 61 for the transmission mechanism of the milling machine as shown respectively in U. S. Letters Patent 1,938,780, issued December 12, 1933, and 1,997,338, issued April 9, 1935. However, as soon as said devices 60 or 61 are actuated to a predetermined position flow of fluid out through the line 59 is stopped with the result that high pressure builds up in the line 59 and the line 57 closing the check valve 50 to the gear pump 18—19, so that now high pressure is maintained in the line 59 solely by means of the plunger pump supplying fluid at relatively low volume and high pressure through the line 44.

Thus during the actuation of the control devices relatively low pressure at high volume is supplied in the line 59 whereas when these devices have been finally moved to their desired positions high pressure immediately builds up in the line 59 and the flow is restricted. This change in demand of fluid pressure supply in the line 59 is utilized to effect the automatic disconnection of the high volume gear pump 18—19 from the line 59 after actuation of the control devices has taken place so as to prevent needless operation of the gear pump under a pressure head when no work is to be done.

This prevents the heating of the fluid supply in the reservoir 40 which would otherwise result were the gear pump permitted to operate, recirculating the fluid continuously under pressure. Since the reservoir 40 is usually formed by part of the machine tool or milling machine housing or frame, heat from the hydraulic fluid would therefore be conveyed to the machine structure causing distortion therein and inaccuracies in the work performed by the machine.

Also this pressure change in the line 59 is utilized to provide automatic lubrication of the milling machine mechanism after the control devices have been adjusted to their various positions while at the same time preventing excessive pressures being built up in the line 59 and the hydraulic control system by the plunger pump when the control devices have been moved to desired operating positions.

In order to accomplish the above results, the plunger 55 in the variable demand compensating valve 54, Figure 4, is actuated by the pressure difference which takes place in the line 59. The line 58—59 has a branch line 62 which is connected to a port 63 of the valve 54 which opens into a chamber 64 provided at the right hand end of the plunger 55. Normally, when the combined gear pump and plunger pump large volume, low pressure supply is being provided in the line 59, the pressure in the chamber 64 is relatively low, permitting the spring 56 to move the valve plunger 55 to the right until its abutment end 55a engages the end surface 65 of the screw plug 66 so that the port 53 of the valve 54 will be normally closed off as stated above to prevent discharge of gear pump pressure through the line 52, valve plunger channel 55b, and port 68 into a drain line 67 which conveys fluid back to the reservoir 40. Thus, during the actual movement of the control devices 60 or 61 the gear pump 18—19 can facilitate the rapid actuation of said devices.

As soon as the control devices are moved to desired predetermined positions, however, pressure builds up in the line 59 and pressure likewise builds up in passageway 62 and in the chamber 64, forcing the valve plunger 55 to the left, Figure 4, compressing the spring 56, whereupon the port 53 is opened through the valve plunger channel 55b of the valve plunger 55 to communication with the exhaust port 68 connected to the drain line 67, whereby the gear pump pressure becomes ineffective and discharges back to the reservoir 40. At the same time as the plunger moves to the left it also opens a discharge port 69 in the valve 54 which is connected through passageways 70 and 71 to a lubricating supply line 72 which, in turn, is connected to the lubricating system of the milling machine.

The spring 56 of the valve 54 may be adjusted by appropriate set screws 73 so that the escape of fluid from the chamber 64 into the port 69 takes place at a predetermined relatively high pressure, sufficient to maintain relatively high pressure in line 59 so the control devices will be properly actuated and held firmly in set condition while at the same time automatically providing a supply of lubricant to the mechanism of the milling machine. The spring 56, of course, is adjusted so as to maintain a pressure not injurious to the normal operation of the plunger pump, while at the same time permitting sufficient volume of fluid to escape through the lubricating line 72 to permit adequate lubrication of the machine. Appropriate drain lines 74 are also provided for the chamber 75 carrying the spring 56 of the valve 54 to drain off any leakage which may pass by the left end of the plunger 55 to the reservoir 40 and thus prevent interference with the proper operation of the valve plunger 55.

Thus in this arrangement has been provided a hydraulic control system for a machine tool capable of automatically delivering fluid pressure in varying amounts in response to demands made on the system by the various devices to be controlled.

What is claimed is:

1. In a fluid pressure system for actuating various control devices of a machine tool, a low-pressure high-volume fluid pressure pump, a high-pressure low-volume pump, means for simultaneously connecting the pressure supply from both of said pumps to actuate control devices of said machine tool, means for automatically disconnecting said low-pressure high-volume pump from said devices when actuation thereof has been completed, and means for automatically connecting discharge from said high-pressure low-volume pump to the lubricating system of the machine while maintaining a predetermined relatively high pressure on said control devices when their actuation has been completed.

2. In a hydraulic pumping mechanism, a housing, hydraulic pressure and lubricant supply mechanism in said housing comprising a gear pump and a plunger pump, common means for driving both of said pumps, a check valve in said housing interconnected between the discharge of said gear pump and the discharge of said plunger pump to permit one-way flow of fluid from said gear pump to said plunger pump, a pressure supply outlet from said plunger pump, a relief valve connected to the discharge from said plunger pump to limit the pressure in said pressure supply outlet, a lubricating supply outlet, and means rendered effective by the operation of said relief valve to connect discharge from said plunger pump to said lubricating supply outlet.

3. In a hydraulic pumping mechanism, a housing, hydraulic pressure and lubricant supply mechanism in said housing comprising a gear pump and a plunger pump, common means for driving both of said pumps, a check valve interconnected between the discharge of said gear pump and the discharge of said plunger pump to permit one-way flow of fluid from said gear pump to said plunger pump, a pressure supply outlet from said plunger pump, a relief valve connected to the discharge from said plunger pump to limit the pressure in said pressure supply outlet, a lubricating supply outlet, and means rendered effective by the operation of said relief valve to connect discharge from said plunger pump to said lubricating supply outlet, and at the same time render pressure supply from said gear pump through said check valve ineffective.

4. In a fluid pressure system for supplying fluid pressure to various fluid pressure consuming devices of a machine tool, some of which make large volumetric demands and others relatively small volumetric demands on said system, the combination of a fluid reservoir, a first pumping mechanism and a second pumping mechanism having intakes connected to said reservoir, a common supply line for said devices, means directly coupling the output of one of said pumping mechanisms to said line, means for selectively directing the output from the other pumping mechanism to said line or to said reservoir, and means responsive to the pressure in said line for operating said selective means.

5. In a fluid pressure system for supplying fluid pressure to various fluid pressure consuming devices of a machine tool, some of which make large volumetric demands and others relatively small volumetric demands on said system, the combination of a fluid reservoir, a first pumping mechanism and a second pumping mechanism having intakes connected to said reservoir, a common supply line for said devices, means directly coupling the output of one of said pumping mechanisms to said line, means for selectively directing the flow from the other pumping mechanism to said line to amplify the flow therein or to another line, and means responsive to the pressure in said supply line for operating said selective means.

6. In a fluid pressure system for various fluid consuming devices of a machine tool some requiring relatively large volumes and others requiring relatively small volumes, the combination with a fluid reservoir, of a first pumping mechanism and a second pumping mechanism having intakes in said reservoir, a common supply line and individual branches to the respective devices, means for connecting the output from one of said pumping mechanisms to reservoir, a selective device for blocking the flow to one of said branch lines and simultaneously directing the flow from said one pumping mechanism to said common line, and means responsive to a drop in pressure in said supply line to effect operation of said flow blocking means.

7. In a pumping mechanism for supplying fluid pressure to a control and lubricating system for a milling machine, the combination of a pair of pumps, a common housing for said pumps, means for simultaneously driving said pumps, means for connecting the discharge from one of said pumps to the discharge for the other pump including a check valve which limits the flow in one direction, a common supply line to said control and lubricating system, valve means responsive to the pressure in said line for connecting the additive pump to reservoir and connecting said common supply line to the lubricating system when the volumetric demand on said common supply line is below a prescribed amount and for blocking the flow to the lubricating system and the flow from the additive pump to reservoir when the volumetric demand on the supply line increases above the prescribed amount.

FRED A. HASSMAN.
HANS ERNST.

REFERENCES CITED

The following references are of record in the file of this patent:

UNITED STATES PATENTS

| Number | Name | Date |
|---|---|---|
| 1,617,460 | Schmidt | Feb. 15, 1927 |
| 1,919,150 | Nenninger | July 18, 1933 |
| 2,012,082 | Hieber et al. | Aug. 20, 1935 |
| 2,070,811 | Sassen | Feb. 16, 1937 |
| 2,163,764 | Rockwell | June 27, 1939 |
| 2,226,431 | Hassman et al. | Dec. 24, 1940 |
| 2,280,392 | Herman et al. | Apr. 21, 1942 |
| 2,330,755 | Smith | Sept. 28, 1943 |